(12) United States Patent
Bürger et al.

(10) Patent No.: US 10,125,887 B2
(45) Date of Patent: Nov. 13, 2018

(54) SOLENOID VALVE

(71) Applicant: WABCO GmbH, Hannover (DE)

(72) Inventors: Jörg Bürger, Neustadt (DE); Armin Sieker, Bielefeld (DE); Andreas Teichmann, Isernhagen (DE)

(73) Assignee: WABCO GMBH, Hannover (DE)

( * ) Notice: Subject to any disclaimer, the term of this patent is extended or adjusted under 35 U.S.C. 154(b) by 33 days.

(21) Appl. No.: 15/123,324

(22) PCT Filed: Feb. 24, 2015

(86) PCT No.: PCT/EP2015/000420
§ 371 (c)(1),
(2) Date: Sep. 2, 2016

(87) PCT Pub. No.: WO2015/131983
PCT Pub. Date: Sep. 11, 2015

(65) Prior Publication Data
US 2017/0067571 A1   Mar. 9, 2017

(30) Foreign Application Priority Data

Mar. 6, 2014   (DE) .................. 10 2014 003 381

(51) Int. Cl.
*F16K 31/06*   (2006.01)
*B60T 15/02*   (2006.01)

(52) U.S. Cl.
CPC ........ *F16K 31/0627* (2013.01); *B60T 15/027* (2013.01)

(58) Field of Classification Search
CPC ............. F16K 31/0627; F16K 31/0606; B60T 15/025; B60T 8/3615; B60T 8/366;
(Continued)

(56) References Cited

U.S. PATENT DOCUMENTS 3,842,860 A   10/1974   Stampfli
4,619,289 A   10/1986   Tsuru et al.
(Continued)

FOREIGN PATENT DOCUMENTS

DE   4102719 A1   3/1992
DE   4310960 A1   10/1993
(Continued)

OTHER PUBLICATIONS

PCT/EP2015/000420 International Search Report dated Aug. 31, 2015, 5 pages.
(Continued)

*Primary Examiner* — Michael R Reid
(74) *Attorney, Agent, or Firm* — Warner Norcross & Judd LLP

(57) ABSTRACT

A solenoid valve (10) comprises a coil core (15), a yoke (16), a valve chamber (13), an inlet armature (11) upstream of an inlet (17) of the valve chamber (13), an outlet armature (12) upstream of a first outlet (18) of the valve chamber (13), and a second outlet (19) at the valve chamber (13), wherein the inlet armature (11) and outlet armature (12) can move and the inlet (17) and first outlet (18) lie opposite one another. In the solenoid valve (10), the inlet (17) and the second outlet (19) are connected to one another by way of an equalizing system having a non-return valve (25), wherein the non-return valve (25) is open towards the inlet (17).

13 Claims, 4 Drawing Sheets

(58) Field of Classification Search
CPC ........... B60T 8/3665; Y10T 137/87217; Y10T 137/86622; Y10T 137/85954; Y10T 137/86936; Y10T 137/86944; Y10T 137/86968; Y10T 137/86976; Y10T 137/86984
USPC .............. 137/870, 596.17, 625.65, 629, 630, 137/630.13–630.15, 563; 303/119.2
See application file for complete search history.

(56) References Cited

U.S. PATENT DOCUMENTS

| | | | |
|---|---|---|---|
| 4,655,249 A | | 4/1987 | Livet |
| 4,655,255 A | | 4/1987 | Rode |
| 5,127,435 A | * | 7/1992 | Takata ................ B60T 8/00 137/596.17 |
| 5,218,996 A | | 6/1993 | Schmitt-Matzon |
| 5,251,667 A | | 10/1993 | Kunz et al. |
| 5,979,997 A | * | 11/1999 | Ohkubo ............... B60T 8/3255 303/116.1 |
| 2004/0035472 A1 | | 2/2004 | Teltscher et al. |
| 2010/0059697 A1 | | 3/2010 | Frank et al. |
| 2010/0327202 A1 | | 12/2010 | Birkelund |

FOREIGN PATENT DOCUMENTS

| | | |
|---|---|---|
| DE | 19933329 C1 | 6/2000 |
| DE | 102007005916 A1 | 8/2008 |
| EP | 1353103 A2 | 10/2003 |
| GB | 1583699 | 1/1981 |
| WO | WO2008034524 A1 | 3/2008 |
| WO | WO20091060810 A1 | 9/2009 |

OTHER PUBLICATIONS

English language abstract and machine translation for DE19933329 (C1) extracted from http://worldwide.espacenet.com database on Jul. 12, 2016, 15 pages.

English language abstract and machine translation for DE102007005916 (AC1) extracted from http://worldwide.espacenet.com database on Jul. 29, 2016, 12 pages.

English language abstract and machine translation for DE4102719 (A1) extracted from http://worldwide.espacenet.com database on Jul. 29, 2016, 11 pages.

* cited by examiner

SOLENOID VALVE

CROSS-REFERENCE TO RELATED APPLICATIONS

This application is the National Stage of International Application No. PCT/EP2015/000420, filed on 24 Feb. 2015, which claims priority to and all advantages of German Patent Application No. 10 2014 003 381.3, filed on 6 Mar. 2013, the content of which is hereby incorporated by reference.

FIELD OF THE INVENTION

The present invention generally relates to a solenoid valve, and more specifically, to a solenoid valve which may be utilized as a control valve, e.g. in braking systems having an anti-lock braking function.

BACKGROUND OF THE INVENTION

DE 43 10 960 A1 discloses a solenoid valve that is supplied from a fluid container under pressure and in which an inlet armature and an outlet armature that is arranged in a coaxial manner with respect to the inlet armature are spring-loaded. A resilient force must be overcome in order to close the inlet armature. Two magnetic coils that are arranged concentrically with respect to one another can be influenced with current so as to actuate the armature. The coils are separated from one another and can be controlled individually in a complex manner. The outlet armature is embodied in a pot-shaped manner and receives the cylindrical inlet armature in sections.

SUMMARY OF THE INVENTION

Generally, it is an object of the present invention to provide a solenoid valve having an improved function. In particular, a reduced consumption of energy is possible and can be realized with the present invention.

The solenoid valve in accordance with the invention comprises an inlet and a second outlet which are connected to one another by way of an equalizing system having a non-return valve. In one embodiment, the non-return valve is arranged in an equalizing line in such a manner that a flow in the direction of the inlet is possible. In this embodiment, the non-return valve may block the flow in the opposite direction. The non-return valve consequently may regulate the flow parallel to the flow in the valve chamber. As a consequence, a resilient element is no longer required to keep the inlet armature open in the state in which the solenoid valve is not being energized. A higher pressure in the valve chamber with respect to a lower pressure upstream of the inlet is equalized by way of the equalizing system. By virtue of the resilient element for the inlet armature being omitted, the solenoid valve consumes less energy during operation.

In one embodiment, the outlet armature is spring-loaded, for example in such a manner that the first outlet is blocked as long as the solenoid valve is not energized. An inlet duct is arranged in the direction of flow upstream of the inlet, the inlet duct extending in part in a coil core. An inlet port for connecting a pressure line is connected upstream to the inlet duct. The equalizing line runs from the inlet duct and leads likewise as a line that leads from the first outlet to a control chamber. The control chamber provides the pressure for a relay valve that is connected to the control chamber and the control chamber can be a component of the equalizing system.

In various embodiments, the solenoid valve comprises three different states owing to the possible positions of the inlet armature and outlet armature. In a first state, the solenoid valve is not energized. The outlet armature closes the first outlet. The second outlet is permanently open. The inlet is not closed. Accordingly, a fluid flow is provided from the inlet to the second outlet. In a second state, the solenoid valve is energized with a low current or with a current that is below the maximum. The inlet armature closes the inlet. The electromagnetic force that acts upon the outlet armature is not sufficient for opening the first outlet. The pressure in the control chamber is consequently maintained. In the third state, the magnetic valve is more intensely energized or is supplied with full current. The inlet is closed by means of the inlet armature, and the outlet armature has raised itself from the first outlet so that a return flow is possible from the control chamber by way of the second outlet to the first outlet. The pressure in the control chamber is reduced.

In accordance with another embodiment of the invention, the inlet armature is embodied in a tapered manner at its end that is facing the outlet armature, wherein the outlet armature comprises an end having an inner taper that corresponds to the end of the inlet armature. The outlet armature and inlet armature are centered with respect to one another by means of the tapered shapes when in the above described states 1 and 3. In particular, the tapered surface of the inlet armature on one hand and the tapered surface of the outlet armature on the other hand lie at least in part against one another. This renders possible a curve of the magnetic field lines that is more efficient in terms of energy in the case of the solenoid valve being fully energized, which renders possible a reduced consumption of energy.

Advantageously, in one embodiment, the solenoid valve may comprise at least one magnetic coil and yoke arms of an optionally C-shaped yoke, the yoke arms being arranged in a transverse manner with respect to the axis of a coil core in such a manner that an imaginary projection line of one of the yoke arms intersects the outlet armature in the case of a closed first outlet in the region of an inner tapered surface. The yoke arm consequently lies approximately at the height of the inner tapered surface that is allocated to the outlet armature. In the case of an opened first outlet, the yoke arm extends in the region of an inner tapered base. In a similar manner, this applies for the various positions of the inlet armature. In the case of a closed inlet, the yoke arm lies approximately at the height of a tapered tip of the inlet armature, in the case of an opened inlet in the region of a tapered surface of the inlet armature. The magnetic flux that originates from the yoke arms enters the outlet armature in an approximately transverse manner.

In accordance with a further embodiment of the invention, precisely one coil is provided so as to move the inlet armature and the outlet armature. The current in the coil can be regulated in particular with the three values, "no current", "low current", "full current". As a consequence, the apparative expenditure is clearly lower than in the case of a solution having two coils that are arranged concentrically within one another.

The embodiments of the present invention may be independent from one another and may be combined with one another and with the further features in any manner.

Advantageously, the outlet armature is spring-loaded and closes the first outlet when the solenoid valve is in the non-energized state. In particular, only the outlet armature is spring-loaded.

In accordance with a further embodiment of the present invention, the inlet armature and outlet armature are in each case spring-loaded in such a manner that in the absence of current the outlet is closed and the inlet is open and that in the case of a full supply of current the inlet is closed and the outlet is open.

In certain embodiments of the invention, a non-magnetic spacing piece can be provided between the inlet armature and the outlet armature. As a consequence, an air gap occurs for the magnetic flux between the inlet armature and the outlet armature, the air gap rendering it possible to more easily detach the outlet armature from the inlet armature. This is advantageous for the transition from the full current/decreasing pressure in the control chamber to the part current/maintaining pressure. In particular, the spacing piece is provided in the region of a tip of an inlet armature or on a surface that is facing the outlet armature. The air gap can extend over the entire region between the inlet armature and the outlet armature. However, an embodiment is also possible in which at least an in part abutment arrangement of outer surfaces of the inlet armature against inner surfaces of the outlet armature remains possible.

In accordance with another embodiment of the present invention, an arrangement and embodiment of the coil core, the inlet armature and the outlet armature are provided in such a manner that a spacing always occurs between the coil core and the outlet armature. The outlet armature does not make physical contact in any position with the coil core. This is achieved by way of example by means of a corresponding geometric design of the inlet armature and the outlet armature and/or by means of a spacing piece between one of the armatures and the coil core. The inlet armature is already positioned between the coil core and the outlet armature.

A non-magnetic spacing piece is advantageously provided between the inlet armature and the coil core. In particular, the spacing piece is arranged on the inlet armature. An air gap always occurs between the inlet armature and the coil core. The inlet armature can be detached easily from the coil core or from the inlet.

One of the end use applications of the solenoid valve is the use as a control valve for an ABS relay valve, for example in a commercial vehicle having a pneumatic braking system and electronic braking system. However, the solenoid valve can also be used in a hydraulic braking system.

Still other objects and advantages of the present invention will be in part by apparent and will in part be obvious from the specification.

BRIEF DESCRIPTION OF THE DRAWINGS

The invention is described in greater detail below with reference to the accompanying drawing figure, in which.

DETAILED DESCRIPTION

Figure 1:
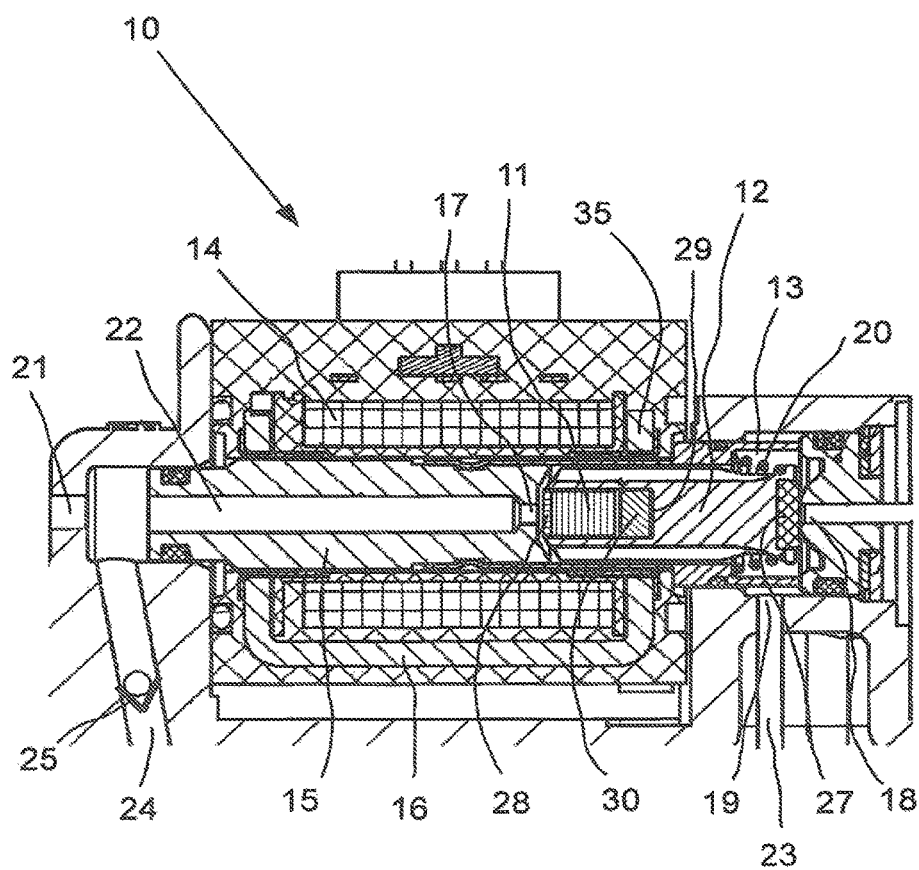
FIG. 1 illustrates a longitudinal section through a solenoid valve according to an embodiment of the present invention.
Figure 2:
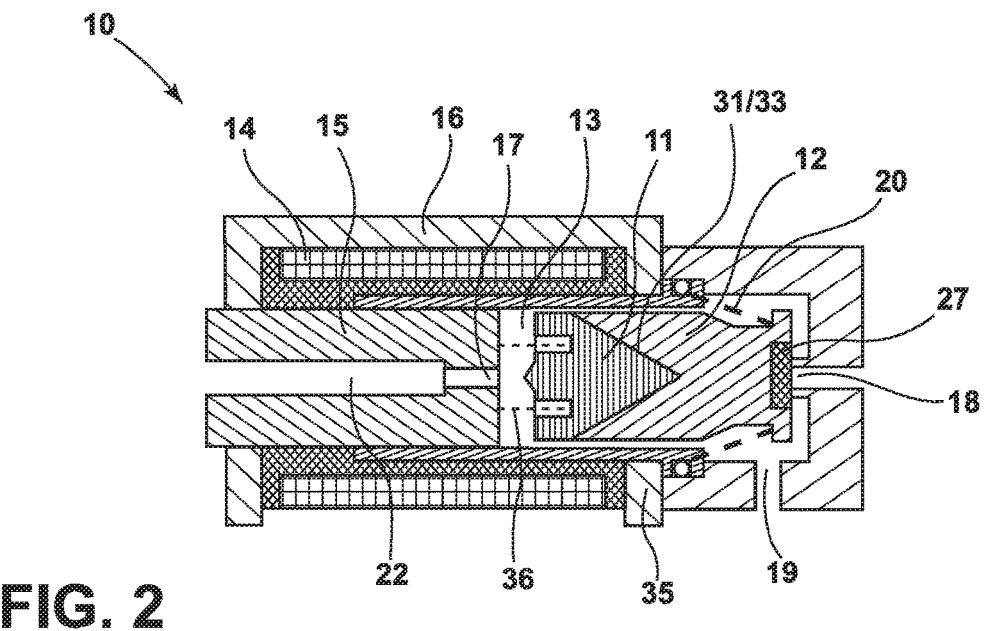
FIG. 2 illustrates a simplified longitudinal section of a further embodiment of a solenoid valve in a non-energized state.

A solenoid valve 10 is disclosed which has an inlet armature 11, an outlet armature 12, a valve chamber 13, a magnetic coil 14, a coil core 15, a yoke 16 that is C-shaped when viewed in the cross section, an inlet 17, a first outlet 18 and a second outlet 19 and which comprises three states. In a first state without a supply of current, the first outlet 18 is closed by means of the outlet armature 12. For this purpose, the outlet armature 12 is influenced by means of the force of a resilient element 20. The inlet 17 is open or undefined, since a force is not acting on the inlet armature 11. The second outlet 19 is permanently open. This state is illustrated in FIG. 1 and FIG. 2.

Figure 3:
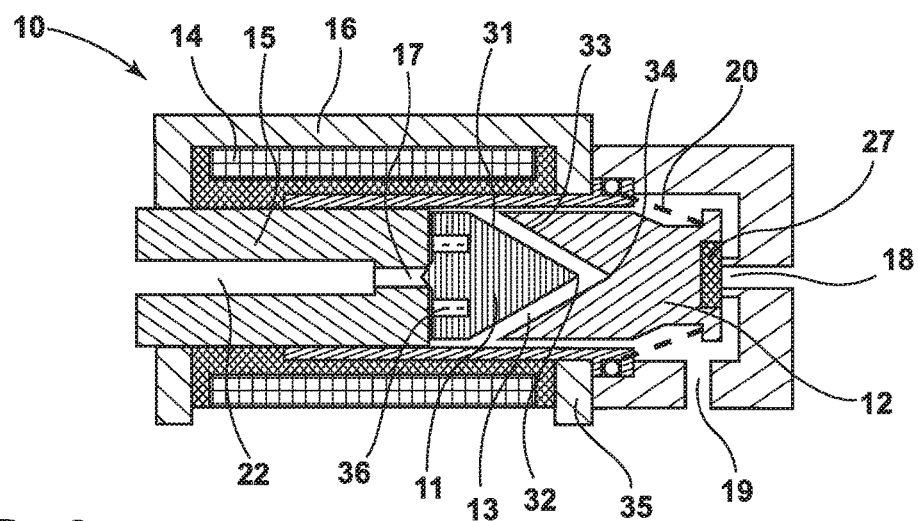
FIG. 3 illustrates the solenoid valve in accordance with FIG. 2 having a low prevailing current.

In a second state, the first outlet 18 is closed, likewise the inlet 17. For this purpose, the magnetic coil 14 is influenced with a low current so that the inlet armature 11 closes the inlet 17. However, the force that is generated by means of energizing the magnetic coil 14 is not sufficient to move the outlet armature 12 against the pressure of the resilient element 20. The state in accordance with FIG. 3 thus occurs.

Figure 4:
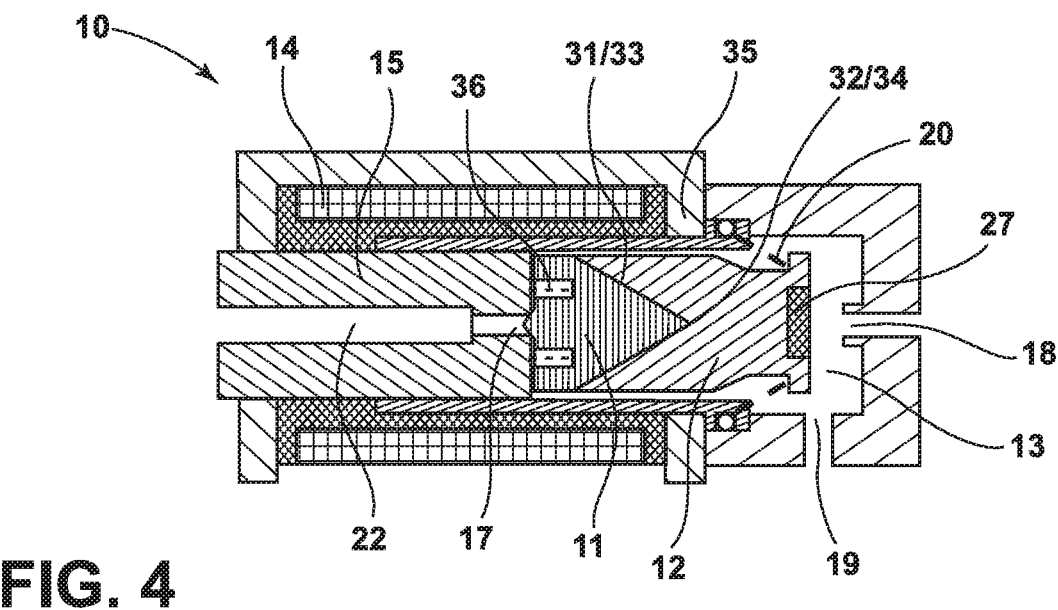
FIG. 4 illustrates the solenoid valve in accordance with FIG. 2 having a full current.

In a third state, the full current prevails at the magnetic coil 14. The inlet armature 11 and outlet armature 12 are both moved in the direction of the inlet 17 by means of the force that is generated, cf FIG. 4. The inlet 17 is closed while the first outlet 18 is open.

In accordance with the switching logic that is provided, in the first state compressed air that is prevailing at an inlet port 21 can pass into a line 23 by way of an inlet duct 22, the valve chamber 13 and the second outlet 19. In the first state, the compressed air that is applied can flow through the solenoid valve 10.

In the second state, pressure that prevails in the line 23 is maintained since the inlet armature 11 and outlet armature 12 close the inlet 17 and the first outlet 18.

In the third state, pressure that prevails in the line 23 can escape by way of the second outlet 19, the valve chamber 13 and the first outlet 18. A reduction in pressure occurs in the line 23.

The transition from the second state (maintaining pressure) to the first state (increasing pressure/valve open) is critical. It is necessary for this purpose for the inlet armature 11 to raise from the inlet 17. Under certain conditions, the pressure in the valve chamber 13 is higher than in the inlet 17. It is possible to raise the inlet armature 11 from the inlet 17 without support. In order to be able to omit an additional resilient element, the second outlet 19 and the inlet 17 are connected to one another by way of an equalizing system that is parallel to the valve chamber 19, the equalizing system including inter alia an equalizing line 24. A non-return valve 25 is provided in the equalizing line 24, the non-return valve rendering it possible to equalize the pressure in the case of a higher pressure in the line 23 and lower pressure in the inlet duct 22.

The line 23 leads to a control chamber 26 that provides the control pressure for the downstream ABS-relay valve (not illustrated). The control chamber 26 can be integrated into the solenoid valve 10 that acts as a control valve or into the ABS relay valve.

Figure 6:
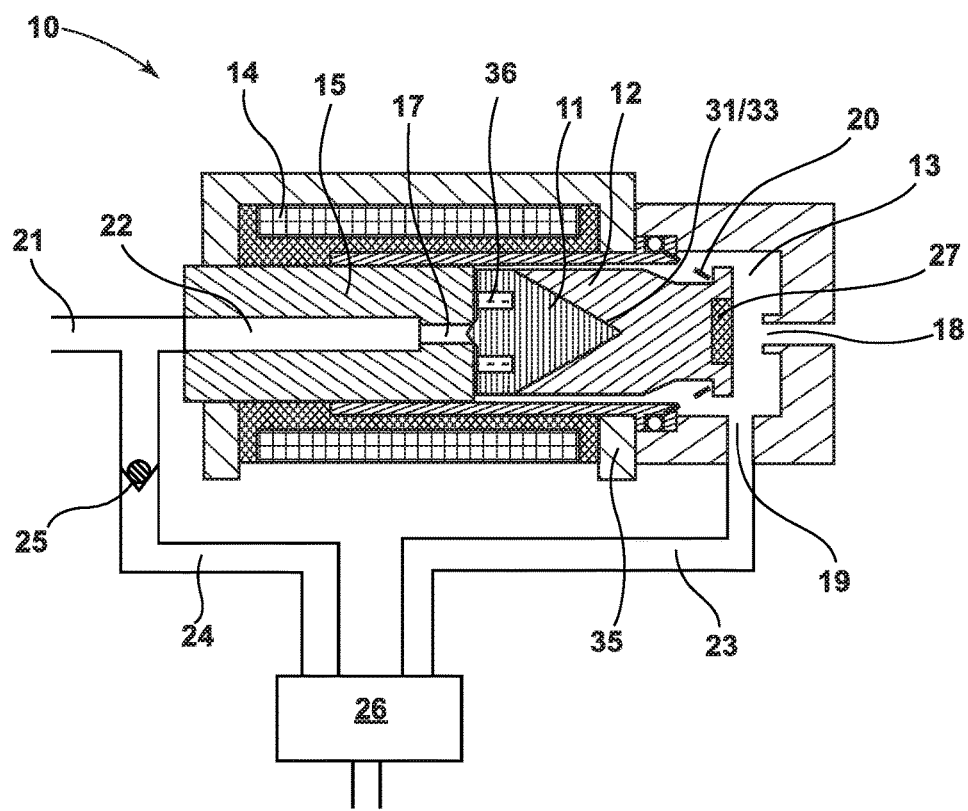
FIG. 6 illustrates the solenoid valve in the state in accordance with FIG. 4 with an additional illustration of a control chamber.

In accordance with FIG. 6, the line 23 and the equalizing line 24 lead into the control chamber 26. A direct connection is also possible between the lines 23 and 24 with a branch (not illustrated) into the control chamber 26. The lines 23, 24, the non-return valve 25, the inlet duct 22 and where appropriate the control chamber 26 form the equalizing system.

In the embodiment of FIG. 1, the solenoid valve comprises some specific features. The outlet armature 12 in the direction of the first outlet 18, in other words on the front end, is provided with a sealing piece 27 whose basic material is particularly suited to the function of sealing. The inlet armature 11 comprises on its end that is facing the inlet 17, of a front end face, a non-magnetic spacing piece 28. The outlet armature 12 is provided with a cylindrical depression on its end that is facing the inlet 17 and a non-magnetic spacing piece 30 is fixed to the base 29 of the depression. The inlet armature 11 moves in the cylindrical depression with a small spacing with respect to the base 29, in other words is essentially encapsulated on the outer side (three-sided) by the outlet armature 12. The inlet armature 11 protrudes slightly beyond the outlet armature 12 so that the latter cannot lie on the coil core 15. The spacing piece 28 causes a reduction of the remaining magnetic force (remanence) between the inlet armature 11 and the coil core 15 and can simultaneously act as a sealing piece for the inlet 17.

In the Figures, the inlet armature 11 and the outlet armature 12 move coaxially along an imaginary valve longitudinal axis (not illustrated). The coil core 15, the inlet duct 22, the inlet 17 and the first outlet 18 are arranged coaxially with respect to the longitudinal axis.

A specific feature is also illustrated in FIGS. 2 to 6. The inlet armature 11 comprises a tapered shape that lies opposite the inlet 17, the tapered shape having a tapered surface 31 and a tapered tip 32. In a similar manner, the outlet armature 12 is provided with an inner tapered surface, in turn having a tapered surface 33 and a tapered base 34. The position of the taper/inner taper is provided in such a manner that a yoke arm 35 of the C-shaped yoke 16, the yoke arm extending in a transverse manner with respect to the axis in this region in the case of an opened first outlet 18 is located approximately at the height of the tapered tip 32 or the tapered base 34, cf FIGS. 4 and 5. In the case of a closed first outlet 18, see FIGS. 2 and 3, the yoke arm 35 extends at approximately half the height of the tapered surface 33. In each case, the outlet armature 12 comprises a clear spacing with respect to the coil core 15. For this purpose, the diameter of the inlet armature 11 near to the coil core 15 almost corresponds to the diameter of the coil core 15.

The magnetic field lines in the region of the transition between the inlet armature 11 and the outlet armature 12 are angled by means of the described tapered design and where appropriate in connection with the arrangement of the yoke arm 35. The inlet armature 11 can consequently be more easily detached from the outlet armature 12 for example during the transition from the first state (without current, FIG. 2) to the second state (low current, FIG. 3).

Figure 5:
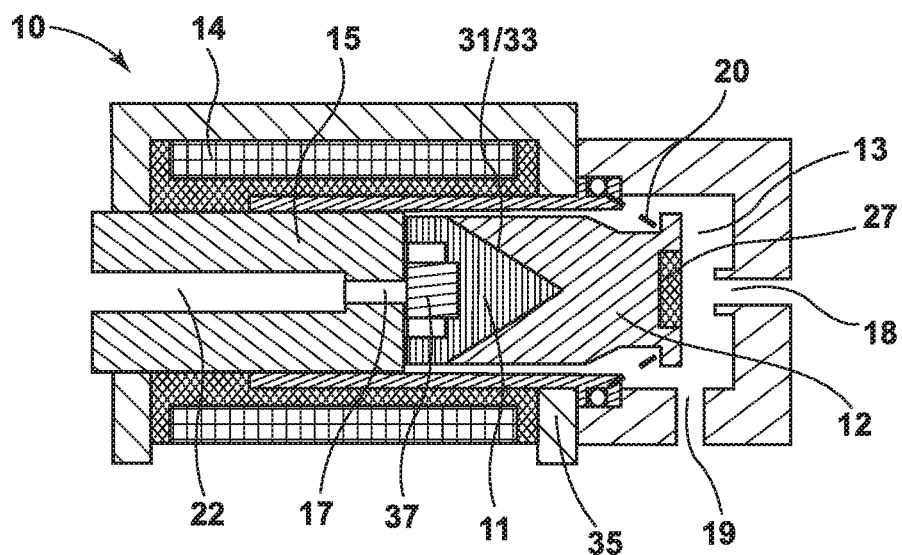
FIG. 5 illustrates a further embodiment in a state according to FIG. 4.

In FIGS. 2, 3, 4 and 6, the inlet armature 11 is loaded by means of a resilient element 36 so as to independently keep the inlet armature 11 open in the non-energized state. In the case of the non-return valve 25 being present in the equalizing line 24 in accordance with FIG. 6, the resilient element 36 can also be omitted. A further embodiment without a resilient element 36 is illustrated in FIG. 5. An in particular non-magnetic spacing piece 37 is held in the inlet armature 11 upstream of the inlet 17.

The inlet armature 11 comprises by means of its tapered shape outside the spacing piece 37 sufficient volume for field lines to travel through in the direction of the coil core 15. The spacing piece 37 causes a small air gap between the inlet armature 11 and the coil core 15. The spacing piece 37 simultaneously acts as a sealing piece for the inlet 17.

What is claimed is:

1. A solenoid valve comprising:
a coil core,
a yoke,
a valve chamber,
an inlet armature downstream of an inlet of the valve chamber,
an outlet armature upstream of a first outlet of the valve chamber, and
a second outlet on the valve chamber, wherein the inlet armature and the outlet armature can move and the inlet and first outlet-lie opposite one another,
wherein the inlet and second outlet are connected to one another by way of an equalizing system having a non-return valve in an equalizing line, such that, in the case of a higher pressure at the second outlet than at the inlet, fluid flows through the equalizing line from the second outlet to the inlet, and wherein the non-return valve is open towards the inlet.

2. The solenoid valve as claimed in claim 1, wherein the inlet armature includes a tapered end that is facing the outlet armature, and wherein the outlet armature comprises an end having an inner taper that corresponds to said tapered end of the inlet armature.

3. The solenoid valve as claimed in claim 2, further comprising at least one magnetic coil and yoke arms that are arranged in a transverse manner with respect to an axis of the coil core in such a manner that an imaginary projection line of one of the yoke arms intersects the outlet armature in the case of a closed first outlet in the region of the inner taper of the outlet armature.

4. The solenoid valve as claimed in claim 1, further comprising precisely one magnetic coil so as to move the inlet armature and the outlet armature.

5. The solenoid valve as claimed in claim 1, wherein the outlet armature is spring-loaded and closes the first outlet in a non-energized state of the solenoid valve.

6. The solenoid valve as claimed in claim 1, wherein the inlet armature and the outlet armature are each spring-loaded in such a manner that the first outlet is closed and the inlet is open when not energized with a current, and that in the case of a full supply of current the inlet is closed and the first outlet is open.

7. The solenoid valve as claimed in claim 1, further comprising a non-magnetic spacing piece between the inlet armature and the outlet armature.

8. The solenoid valve as claimed in claim 1, wherein the inlet armature and the outlet armature are configured in such a manner that a space is defined between the coil core and the outlet armature.

9. The solenoid valve as claimed in claim 1, further comprising a non-magnetic spacing piece between the inlet armature and the coil core.

10. An ABS relay valve comprising the solenoid valve as claimed in claim 1.

11. The solenoid valve as claimed in claim 1, wherein the inlet armature and the outlet armature can move in a coaxial manner.

12. A commercial vehicle comprising the solenoid valve of claim 1.

13. A commercial vehicle comprising the ABS relay valve of claim 10.

* * * * *